Oct. 22, 1946.    F. L. HETZEL ET AL    2,409,757
CLUTCH
Filed June 24, 1944    2 Sheets-Sheet 2
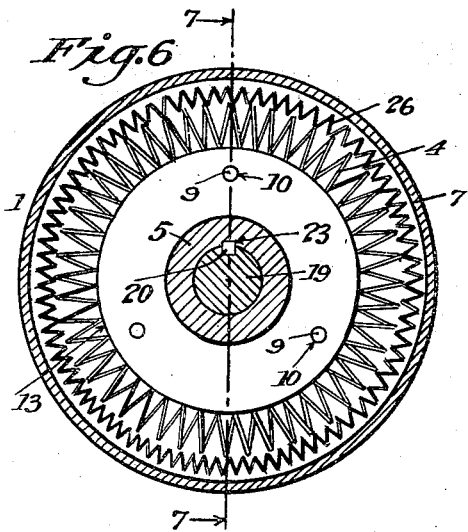
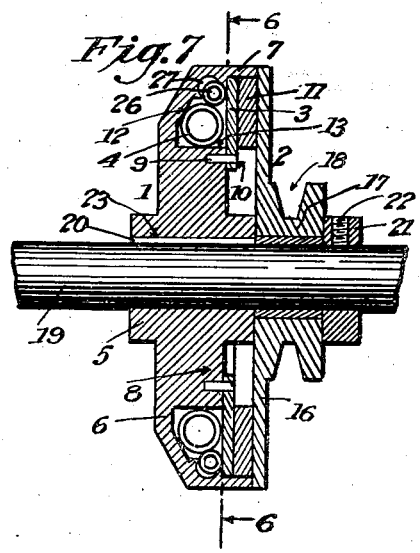
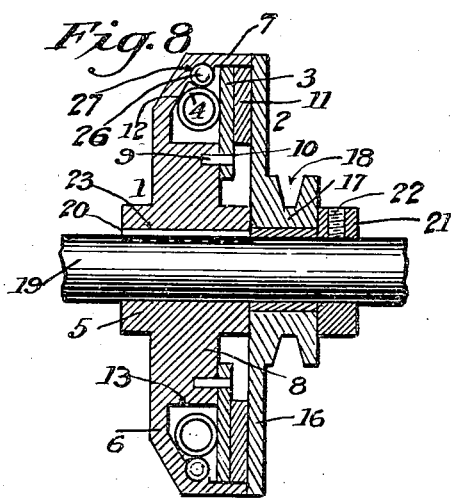
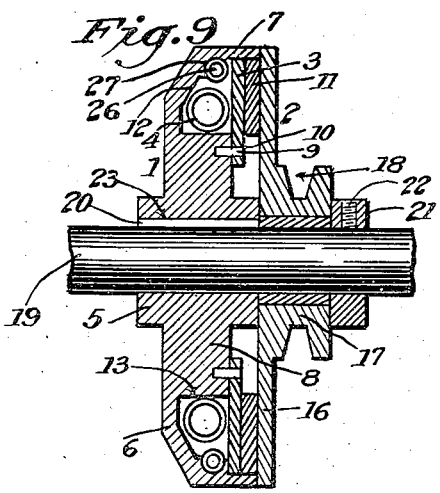
INVENTORS.
Frank L. Hetzel,
BY Volney E. Carstedt,
Alan Franklin,
ATTORNEY.

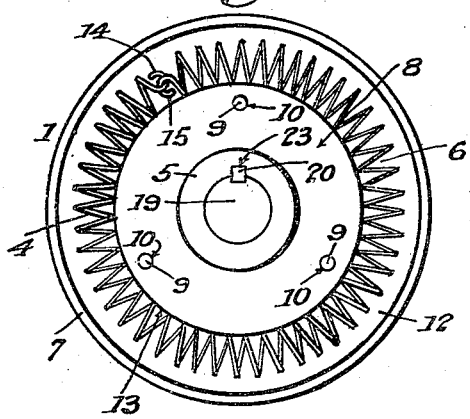
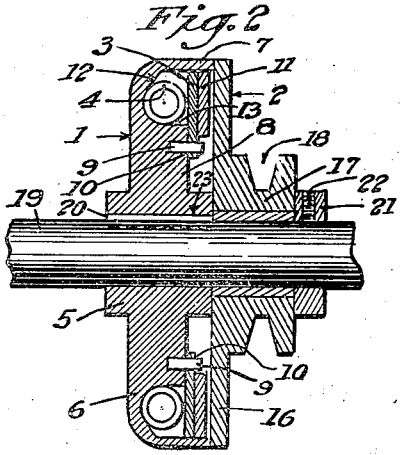
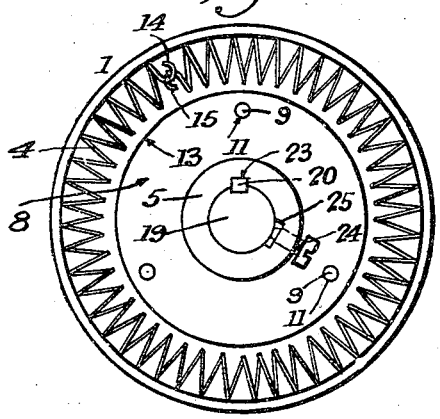
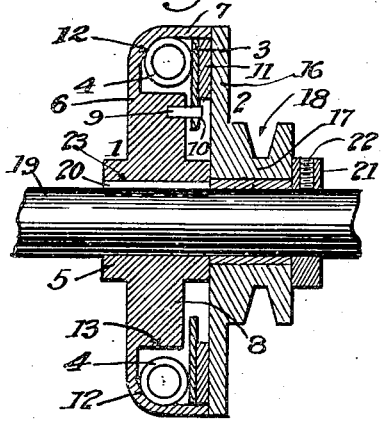
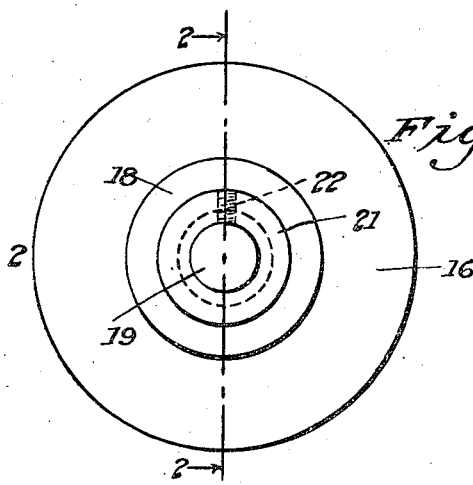
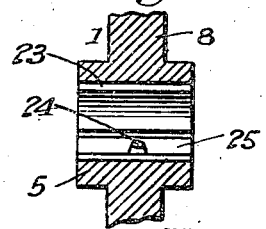

Patented Oct. 22, 1946

2,409,757

UNITED STATES PATENT OFFICE 2,409,757

CLUTCH

Frank L. Hetzel, Hermosa Beach, and Volney E. Carstedt, Los Angeles, Calif.

Application June 24, 1944, Serial No. 541,886

3 Claims. (Cl. 192—105)

This invention relates to clutches and more particularly to a clutch of the centrifugal type.

The general object of the invention is to provide an improved centrifugal clutch, which is simple in construction, efficient in operation, easy to repair and inexpensive to manufacture.

A more particular object is to provide an improved centrifugal clutch with means, actuated by centrifugal force, for causing the clutch members to be interengaged, when one of the clutch members is rotated above a predetermined speed.

A further object is to provide a centrifugal clutch with means for causing the clutch members to be interengaged during rotation of one of said members up to a predetermined speed, and including means actuated by centrifugal force, for causing the clutch members to be interengaged when one of the clutch members is rotated above said predetermined speed.

Other objects and advantages will appear hereinafter as this specification progresses.

The invention is illustrated in the annexed drawings, which form a part of this specification, and in which:

Fig. 1 is an inner side view of one of the clutch members, with the friction ring removed from said member, and the actuating spring contracted to its inoperative position.

Fig. 2 is a longitudinal section of the clutch taken on line 2—2 of Fig. 5, with the clutch members disengaged and the clutch in its inoperative position.

Fig. 3 is a view like Fig. 1, except that the actuating spring of the clutch is shown in its expanded and operative position.

Fig. 4 is a view like Fig. 2, except that the clutch members are shown engaged with the clutch in its operative position.

Fig. 5 is a side view of the clutch.

Fig. 6 is a cross section taken on line 6—6 of Fig. 7, of one of the clutch members of a modification of our invention, with the friction ring removed from said member and with the main actuating spring contracted to its inoperative position and the auxiliary spring contracted into its operative position, which positions of said springs, are assumed when either clutch member is rotated below a predetermined speed and the clutch is in its starting drive position.

Fig. 7 is a longitudinal section of the modification of our clutch, as illustrated in Fig. 6, taken on line 7—7 of Fig. 6.

Fig. 8 is a view like Fig. 7 of the modification of our clutch shown in Fig. 6, with the auxiliary spring expanded by centrifugal force out of engagement with the friction ring and the actuating spring expanded into engagement with said ring, which positions of said springs are assumed when said clutch member is rotated above a predetermined speed and the clutch is in its power drive position.

Fig. 9 is a view like Fig. 7 of the modification of our clutch shown in Fig. 6, with the actuating spring contracted out of engagement with the friction ring and the auxiliary spring expanded out of engagement with said ring, when one of the clutch members is rotated by the power shaft at a predetermined speed, and the clutch as idling with its other member stationary and said power shaft turning therein.

Fig. 10 is a fragmentary section taken on line 2—2 of Fig. 5 illustrating novel means for preventing one of the clutch members from sliding on a shaft.

Referring more particularly to the drawings in which corresponding parts are designated by the same reference characters in all of the views our clutch includes primarily a pair of clutch members 1 and 2, a flat clutch ring 3 and an actuating coil spring 4 arranged in ring formation.

The clutch member 1 is of circular dish formation, open at its forward side and formed with a hub 5, a side wall 6, a cylindrical peripheral wall 7 extending forwardly from said side wall, and an enlarged hub portion 8 formed also integral with said side wall 6 and extending forwardly therefrom to a point within the forward annular edge of said cylindrical peripheral wall 7. A plurality of pins 9, preferably three, are secured in the enlarged hub portion 8 equidistant apart and project forwardly therefrom, slidably through a corresponding number of openings 10, respectively, in the clutch ring 3, near the inner edge of said ring, whereby said ring is detachably mounted in operative position in the forward side of the clutch member 1. An annular friction clutch shoe 11 of suitable material is secured to the forward side of the clutch ring 3, for engaging the clutch member 2 as will be hereinafter more fully described. In the corner between the side wall 6 and the cylindrical peripheral wall 7 is formed an annular cam 12 to be engaged by the actuating coil spring 4 in the manner and for the purpose hereinafter described. The spring 4 is positioned within the clutch member 1 around the periphery 13 of the enlarged hub portion 8 of said clutch member between the side wall 6 of said clutch member and the clutch ring 3, with the ends of said spring connected together by interengaging hooks 14 and 15 formed on the ends, respectively, of said spring; the spring being of such length that with its ends connected together it is contracted around and against the periphery 13 of the enlarged hub portion 8 under proper tension in its ineffective position when the clutch member 1 is at rest, as illustrated in Figs. 1 and 2, for the purpose hereinafter described.

The clutch member 2 comprises a disc 16 with a hub 17 extending outwardly therefrom in which hub is formed a grooved pulley 18 to receive a belt through which power may be transmitted by the clutch.

The clutch member 1 is keyed on a drive shaft 19 by a key 20, while the clutch member 2 is turnably mounted on said shaft and is maintained in its operative position on said shaft, with its disc 16 adjacent the forward end of the hub 5 and the forward edge of the cylindrical peripheral wall 7 of the clutch member 1, by a collar 21 secured on said shaft 19, by a set screw 22, adjacent the forward end of the hub 17 of said clutch member 2, the shaft 19 extending through and being operatively fitted in the bores of the hubs 5 and 17 of the clutch members 1 and 2, respectively, with the key 20 secured in the shaft 19 and fitted in a groove 23 in the hub 5 of the clutch member 1.

The clutch member 1 is secured on the shaft 19 against sliding on its key 20, by means of a set screw 24, threaded in the hub 5 of said clutch member and extending through said hub and through a longitudinal groove 25 in the bore of said hub, into engagement with said shaft. The width of the groove 25 is greater than the diameter of the set screw 24, so that the end of said screw when tightened against the shaft 19 may upset the surface of said shaft around said screw end in said groove, which prevents sliding of the end of said screw on said shaft, and thus locks the clutch member 1 on said shaft against sliding on said shaft over the key 20. Upon loosening said set screw 24 and withdrawing its end from the upset portion of the shaft 19 the clutch member 1 may be withdrawn from said shaft, the key 20 passing through the key groove 23 in the hub 5 of said clutch member and the upset portion of the shaft 19 passing through the groove 25.

The operation of the invention is as follows:

When the shaft 19 and the clutch member 1, are at rest the actuating spring 4 is contracted by its tension around and into engagement with the periphery 13 of the enlarged hub portion 8 and into engagement with the side wall 6 of said clutch member, releasing the forward pressure of the spring against the clutch ring 3, whereby said clutch ring and its shoe 11 are allowed to move away from the disc 16 of the clutch member 2, releasing said shoe from said disc, said movement of said ring being permitted by the pins 9 sliding in the openings 10 in said ring, as illustrated in Figs. 1 and 2 of the drawings.

Rotation of the drive shaft 19 rotates the clutch member 1, and, at a predetermined speed of rotation of said clutch member, the contracted actuating spring 4 is expanded outwardly by centrifugal force and is directed forwardly by its engagement with the cam 12, into engagement with the clutch ring 3, whereby said ring is moved forwardly, sliding on the pins 9 until the ring shoe 11, engages the disc 16 of the clutch member 2 with sufficient friction to cause the clutch member 1 to rotate the clutch member 2 so that the power of the shaft 19 may be transmitted by the clutch, through its pulley 18 and a belt extending around said pulley, to any suitable mechanism for driving said mechanism.

In the modification of our invention shown in Figs. 6 to 9 inclusive the construction is substantially the same as that shown in Figs. 1 to 5 inclusive, with the addition of an auxiliary coil spring 26 of smaller diameter than the diameter of the actuating spring 4, arranged in ring formation of greater diameter than the diameter of the ring formation of said actuating spring 4 and surrounding said actuating spring, in its ring formation, in the clutch member 1, there being an annular groove 27 in the inner side of the peripheral wall 7 of said clutch member 1 at the outer end of the annular cam 12, into which groove said auxiliary spring 26 is expanded by centrifugal force when said clutch member 1 is rotated above a predetermined speed.

When the clutch member 2 is roated at any speed up to a predetermined speed, the auxiliary spring 26 is contracted, so that it engages the actuating spring 4 and the flat clutch ring 3 (Figs. 6 and 7) and presses said ring and its shoe 11 outwardly until said shoe engages the disc 16 of the clutch member 2 with sufficient friction to cause the clutch member 1 and shaft 19 to be rotated slowly by the clutch member 2 at a speed below said predetermined speed. Above said predetermined speed said auxiliary spring 26 is expanded outwardly in its ring formation by centrifugal force, into the annular groove 27 in the peripheral wall 7 of the clutch member 1, (Fig. 9) and the actuating spring 4 is expanded outwardly in its ring formation by centrifugal force and is directed forwardly by its engagement with the cam 12 into engagement with the clutch ring 3 (Fig. 8) and said ring and its shoe 11 are thereby forced forwardly until said shoe engages the disc 16 of the clutch member 2 with sufficient friction to cause the clutch member 1 to rotate the clutch member 2, so that the power of the shaft 19 may be transmitted by the clutch through the pulley 18 on the clutch member 2 as aforesaid, above said predetermined speed.

We claim:

1. A clutch as disclosed comprising a clutch member to be secured on a rotatable shaft, a second clutch member to be turnably mounted on said shaft, a clutch ring mounted to move laterally in said first clutch member, an actuating coil spring in said first clutch member arranged in ring formation and to be expanded by centrifugal force upon rotation of said first clutch member above a predetermined speed, and a cam in said first clutch member to be engaged by said spring when expanded to cause said spring to engage and move said clutch ring forwardly into frictional contact with said second clutch member to clutch said second clutch member to said first clutch member, an auxiliary spring in said first clutch member arranged in ring formation surrounding said actuating spring in its ring formation and constructed and arranged to be contracted between said actuating spring and said clutch ring to force said clutch ring into frictional contact with said second clutch member to clutch said clutch members together, when said second clutch member is rotated below said predetermined speed, and said auxiliary spring being constructed and arranged to be expanded by centrifugal force out of effective frictional contact with said clutch ring when either of said clutch members is rotated above said predetermined speed.

2. A clutch as claimed in claim 1 in which the first clutch member is formed with an annular groove into which the auxiliary spring is expanded when either clutch member is rotated above a predetermined speed.

3. A clutch as disclosed comprising a first clutch member to be secured on a rotatable shaft, a second clutch member turnably mounted on said shaft, means for clutching said clutch members together when either of said clutch members is rotated below a predetermined speed, and means for automatically clutching said clutch members together when either of said clutch members is rotated above a predetermined speed and said first clutching means is disengaged and thereby rendered ineffective.

FRANK L. HETZEL.
VOLNEY E. CARSTEDT.